(12) United States Patent
Schmidt

(10) Patent No.: US 10,584,793 B2
(45) Date of Patent: Mar. 10, 2020

(54) PISTON RING

(71) Applicant: FEDERAL-MOGUL BURSCHEID GMBH, Burscheid (DE)

(72) Inventor: Peter Schmidt, Burscheid (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 70 days.

(21) Appl. No.: 15/765,871

(22) PCT Filed: Jul. 7, 2016

(86) PCT No.: PCT/EP2016/066129
§ 371 (c)(1),
(2) Date: Apr. 4, 2018

(87) PCT Pub. No.: WO2017/059971
PCT Pub. Date: Apr. 13, 2017

(65) Prior Publication Data
US 2018/0283552 A1    Oct. 4, 2018

(30) Foreign Application Priority Data
Oct. 5, 2015   (DE) .................. 10 2015 116 838

(51) Int. Cl.
F16J 9/22        (2006.01)
F16J 9/20        (2006.01)
F16J 9/12        (2006.01)

(52) U.S. Cl.
CPC . *F16J 9/22* (2013.01); *F16J 9/20* (2013.01); *F16J 9/12* (2013.01)

(58) Field of Classification Search
CPC .. F16J 9/00; F16J 9/12; F16J 9/20; F16J 9/22
See application file for complete search history.

(56) References Cited

U.S. PATENT DOCUMENTS

| | | | | |
|---|---|---|---|---|
| 1,378,894 A | * | 5/1921 | Norman | F16J 9/20 277/460 |
| 2,209,925 A | * | 7/1940 | Mason | F16J 9/20 277/465 |
| 2,287,884 A | * | 6/1942 | Jominy | F16J 9/20 277/442 |
| 2,313,395 A | * | 3/1943 | Phillips | F16J 9/20 277/442 |
| 2,402,033 A | * | 6/1946 | Flinn | F16J 15/3412 277/424 |

(Continued)

FOREIGN PATENT DOCUMENTS

| | | | |
|---|---|---|---|
| CH | 373 594 A | 11/1963 | |
| GB | 937398 A | * 9/1963 | ................. F16J 9/22 |

OTHER PUBLICATIONS

CH373594 Machine Translation from espace.net, retrieved Aug. 8, 2019 (Year: 1959).*

*Primary Examiner* — Nicholas L Foster
(74) *Attorney, Agent, or Firm* — Robert L. Stearns; Dickinson Wright, PLLC

(57) ABSTRACT

A piston ring for an internal combustion engine is provided, having at least one indentation provided on a ring edge of the piston ring, wherein the at least one indentation in the circumferential direction of the piston ring has a varying depth profile.

12 Claims, 2 Drawing Sheets

(56) References Cited

U.S. PATENT DOCUMENTS

| | | | | |
|---|---|---|---|---|
| 4,438,937 | A * | 3/1984 | Moriarty | F16J 9/20 277/447 |
| 4,681,326 | A * | 7/1987 | Kubo | F16J 9/12 277/447 |
| 4,736,586 | A * | 4/1988 | Kawajiri | F02G 1/0535 277/451 |
| 6,189,893 | B1 * | 2/2001 | Hartmann | F16J 9/22 277/443 |
| 10,125,870 | B2 * | 11/2018 | Mittler | F16J 9/20 |
| 2006/0220322 | A1 * | 10/2006 | McCormick | F16J 9/22 277/442 |
| 2015/0300492 | A1 * | 10/2015 | Mittler | F16J 9/20 277/460 |
| 2019/0154152 | A1 * | 5/2019 | Mittler | F16J 9/206 |

* cited by examiner

PISTON RING

BACKGROUND

1. Technical Field

The present invention relates to a piston ring and, in particular, a piston ring with improved durability for modern internal combustion engines.

2. Related Art

Compression piston rings (hereinafter referred to generally as "piston rings") mainly perform the task of sealing the combustion chamber against the crankcase of an internal combustion engine, to prevent the penetration of combustion gases into the crankcase and, to a lesser extent, the penetration of lubricating oil into the combustion chamber. Piston rings seal not only at the bearing surface, i.e. at the interface of the outer axial surface of the piston ring and the inner wall of the cylinder, but also at the lower edge, i.e. at the interface between the piston ring and piston ring groove and the lower radial surface of the piston ring. Here and in the following, "lower" means the side of the cylinder or piston facing away from the combustion chamber.

In today's highly pressurized machines, both corrosive and abrasive attacks often occur at the lower ring edges of the piston ring. The reason for this is that too little lubrication oil reaches the space between the ring edge and the piston groove. The problem will become more acute in the near future, as further attempts are made to reduce the quantity of lubricant reaching the area between the piston groove and the piston ring. This is used to avoid so-called "oil pumping", i.e. the unwanted pumping of oil into the combustion chamber due to the wobbling of the piston ring during the up-and-down movement of the piston, and ultimately therefore provides emissions control and reduction of harmful combustion materials.

The corrosion and abrasive wear on the groove and on the edge of the piston ring limits the functional seal tightness, which can result in higher blow-by values and ultimately a failure of the piston rings after short service lifetimes.

In order to counteract the wear of the bearing surfaces, these are chrome plated. In the problem of wear on the ring edges described above, however, the chrome plating seldom has a very positive effect. In CH 373594 A, to prevent the dry friction between the two metal surfaces of the piston ring and groove it is proposed to provide at least the (upper) surface of the piston ring facing the combustion chamber with indentations that are filled with a dry lubricant containing a binding agent. The dry lubricant simultaneously provides corrosion protection.

However, the protection against abrasion and/or corrosion afforded by such indentations is of only very limited duration. If any additional abrasion-promoting factors come into play, such a protective indentation can be worn away within a short period of time and thus lose its protective effect. The present invention provides a solution for the above problems.

BRIEF DESCRIPTION OF THE INVENTION

The present invention relates to a piston ring and, in particular, a piston ring with improved durability for modern internal combustion engines. Where mention is made here of a side facing towards or away from the combustion chamber, this does not necessarily imply that the corresponding feature is only effective in the assembled condition, but rather relates to the installation direction for the piston ring described in relation to the crankcase and combustion chamber. This intended installation direction is usually noted on the piston ring (e.g. "top" imprinted on a ring edge).

In a preferred embodiment of the present invention, a piston ring for an internal combustion engine is provided, comprising at least one indentation provided on a ring edge of the piston ring, wherein the at least one indentation has a varying depth profile in the circumferential direction of the piston ring.

In one embodiment, the ring edge is facing away from the combustion chamber. In another embodiment, the ring edge faces towards the combustion chamber.

In one embodiment, the piston ring also comprises at least one indentation provided on the ring edge facing towards the combustion chamber, wherein the at least one indentation has a varying depth profile in the circumferential direction of the piston ring.

In one embodiment, the axial distance between ring edge and the highest point of the indentation is no greater than 50% of the axial distance between ring edge and a deepest point of the indentation.

In one embodiment, the depth profile of the indentation has a sinusoidal shape, an undulating shape, a zig-zag shape, a saw-tooth shape, or a trapezoidal shape.

In one embodiment, the indentation in the ring edge of the piston ring over a part of the ring edge has a radially varying distance from the border of the ring edge.

In one embodiment, the radial distance from the border of the ring edge varies sinusoidally in the circumferential direction.

In a further embodiment the piston ring comprises a second indentation provided on the ring edge facing away from the combustion chamber, wherein the at least one indentation has a varying depth profile in the circumferential direction of the piston ring, which is phase-shifted with respect to the depth profile of the first indentation.

In one embodiment, a soft material is introduced into one or a plurality of the at least one indentations.

In one embodiment the soft material comprises a material that is selected from a group consisting of copper, molybdenum, titanium, chromium, cobalt, nickel, tin, zinc, tungsten, or alloys thereof.

In one embodiment, the soft material comprises a material selected from a group consisting of copper, molybdenum or lubricant varnish.

In one embodiment, the filling height of the soft material in the indentation is between 5% and 50% and most preferably, between 10% and 30%.

In one embodiment, on the side of the ring edge facing away from the combustion chamber, at least two indentations are provided, one of which is filled with the soft material and the other is unfilled.

In one embodiment, on the side of the ring edge facing towards the combustion chamber, at least two indentations are provided, one of which is filled with the soft material and the other is unfilled.

THE DRAWINGS

All drawings shown here are schematic in nature and exemplary. Scales and sixes can be exaggerated in order to illustrate the effects and design of the invention. Wherever possible, the same reference numerals are used to designate the same or similar parts.

DETAILED DESCRIPTION OF THE DRAWINGS

Figure 1:
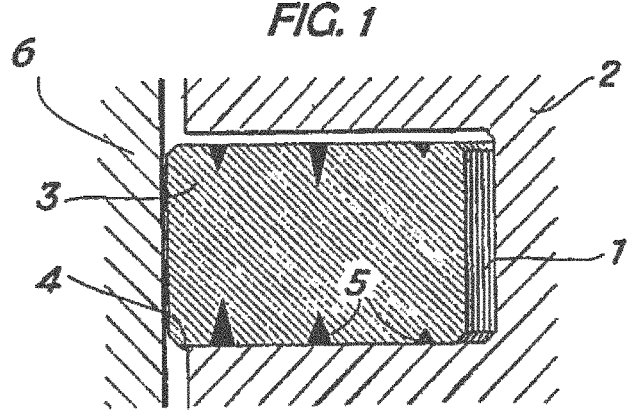
FIG. 1 is a cross-sectional view of a piston ring according to an embodiment the present invention, which is installed in a piston groove.

The present invention relates to a piston ring and, in particular, a piston ring having improved durability for modern internal combustion engines. FIG. 1 is a cross-section view of a piston ring according to an embodiment of the present invention, which is installed in a piston groove.

FIG. 1 shows, in particular, an indentation or groove 1 in a piston 2 of an internal combustion engine. A piston ring 3 is inserted in the groove 1. In FIG. 1 the combustion chamber (not shown) is located above the arrangement shown. By the contact pressure of the combustion gases, the piston ring is usually pressed downwards, i.e. away from the combustion chamber. As a result, significant abrasive forces occur on the bearing surface of the piston ring 3 (i.e., at the interface of the outer axial surface of the piston ring 3 and a cylinder inner wall 6) and, on the other hand, on the lower edge 4 of the piston ring 3 (i.e. at the interface between the piston ring groove 1 and the lower radial surface of the piston ring 3).

The indentations 5 according to the present invention are shown schematically on the lower edge 4 and the top edge of the piston ring. Since due to the pressure the forces on the lower edge are usually stronger, the indentations 5 on the lower edge of the piston ring 5 are particularly preferred, whereas the indentations on the upper edge in the present invention are optionally provided.

Figure 2A:
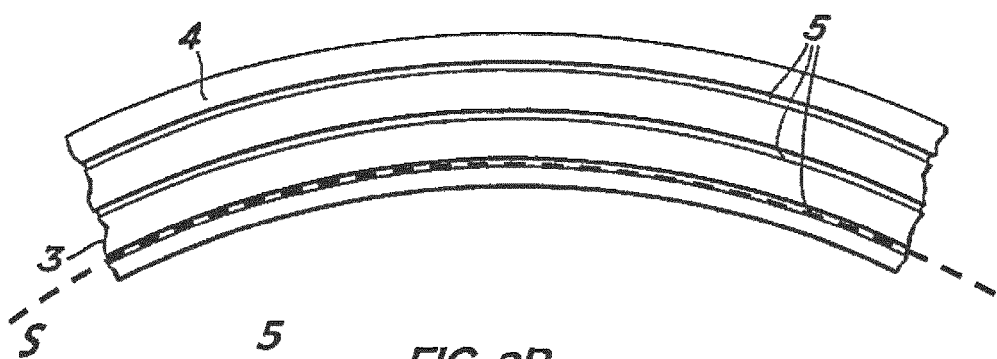
FIG. 2A is a view of a segment of a piston ring in accordance with an embodiment of the present invention.

FIG. 2A is a view of a segment of a piston ring in accordance with an embodiment of the present invention. FIG. 2A shows the indentations 5 in the piston ring 3 as concentric indentations in the lower ring edge 4. Corresponding indentations can, however, also be provided on the upper ring edge of a piston ring according to the present invention.

Figure 2B:
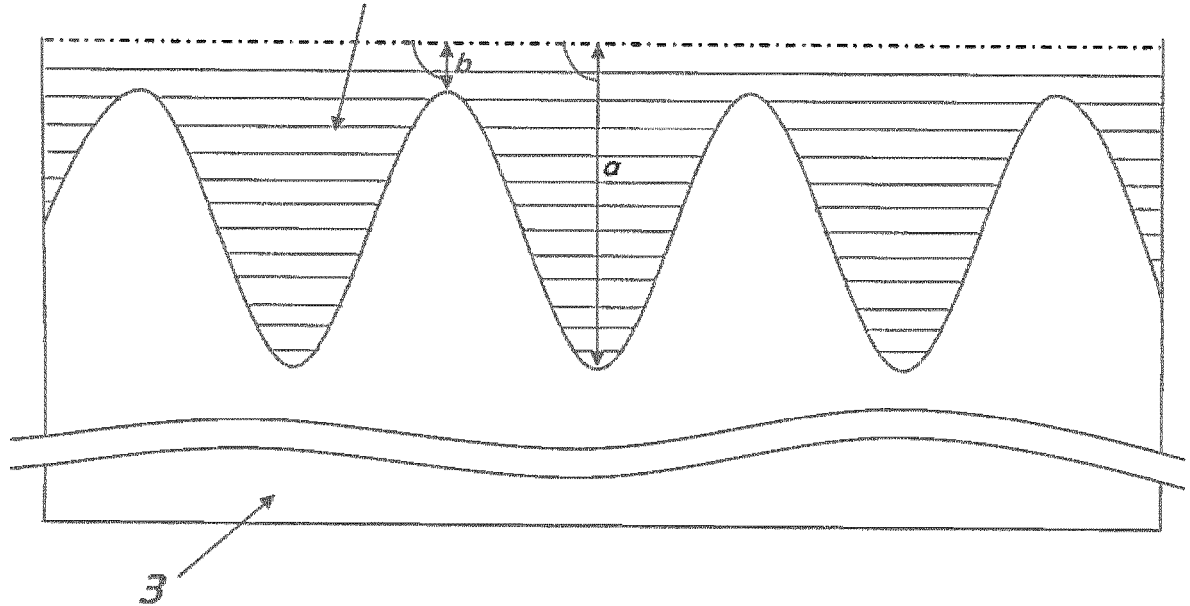
FIG. 2B is a cross-sectional view through the piston ring of FIG. 2A along the section line S, which shows a depth profile of the indentation.

FIG. 2B is a cross-sectional view through the piston ring 3 of FIG. 2A along the section line S. FIG. 2B shows, in particular, that the depth of the indentation 5 along the indentation 5 is not constant, but varies to a certain extent, preferably in a regular manner. FIG. 2B shows by way of example a sinusoidal indentation profile, wherein the hatched upper part indicates the material removed to form the indentation 5. In addition to a sinusoidal shape of the depth profile of the indentation 5, other profile shapes are also possible, such as an undulating shape, zig-zag shape, saw-tooth shape, trapezoidal shape, etc. The shape of the indentations is not intended to be hereby limited. The different forms can be freely combined among indentations 5 of a ring edge and between the ring edges. However, particularly preferred is an undulating or sinusoidal shape as shown schematically in FIG. 2B.

In a radial cross section, (such as the one in FIG. 1), the indentation preferably has a V-shape (as shown in FIG. 1), rectangular shape, trapezoidal shape, the form of an indentation with rounded bottom (U-shape), or other suitable form, which should not be limited thereto. In one embodiment, the axial distance b between ring edge 4 and the highest point of the indentation is no greater than 50% of the axial distance a between ring edge 4 and a deepest point of the indentation.

Figure 3:
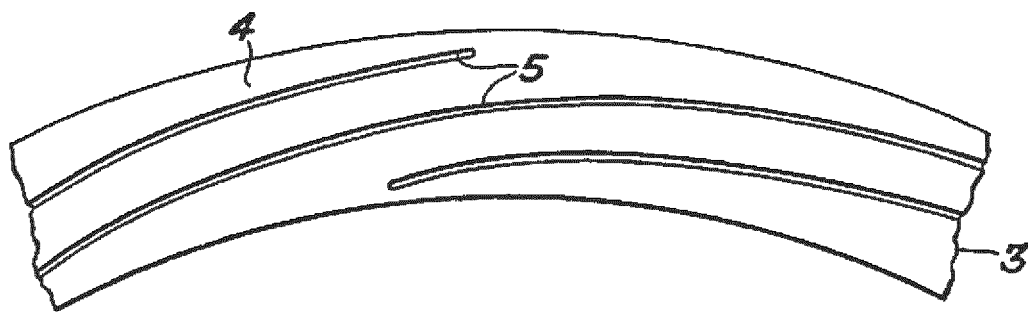
FIG. 3 is a view of a segment of a piston ring in accordance with another embodiment of the present invention.
Figure 4:
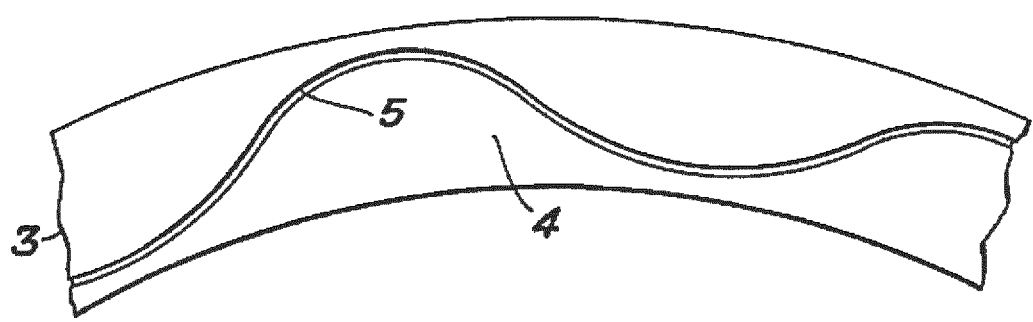
FIG. 4 is a view of a segment of a piston ring in accordance with another embodiment of the present invention.

FIGS. 3 and 4 each show a segmental view of a piston ring in accordance with other embodiments of the present invention. FIG. 3 shows schematically how a plurality of indentations 5 are provided concentrically offset on the ring edge 4 of the piston ring 3. FIG. 4 shows that the indentation 5 in the ring edge 4 of the piston ring 5 has an undulating shape, the indentation 5 in the ring edge 4 thus meanders over a part of the radial height of the piston ring 3. In other words, the indentation 5 in the ring edge 4 of the piston ring 3 has a radially varying distance from the border of the ring edge 4 over a part of the ring edge 4. The outer edge of the ring edge (4) is preferably meant here. This undulating form is particularly preferred, so that a particularly positive effect can be achieved in a sinusoidal or wave-like indentation 5 (as shown in FIG. 4) with a sinusoidal or wave-like indentation profile (as shown in FIG. 2B).

Due to the surrounding or partially surrounding indentations 5 it is possible to ensure that over the different pressure conditions a flow of oil in the circumferential direction in the groove is guaranteed. The oil thus provided diminishes abrasion and corrosion at the lower edge 4 of the piston ring 3 in a known way, and in optional embodiments also at the upper edge of the piston ring 3. If a plurality of indentations 5 are arranged parallel to each other (such as in FIG. 2A, for example), it is desirable for the depth profiles of the individual indentations 5 not to be arranged in phase (i.e. deepest point of the indentation in a radial direction above a deepest point of the adjacent indentation 5), but in a phase-shifted manner (peak over valley). Thus, even in the event of uneven wear of the piston ring a certain amount of oil flow is ensured in the circulation direction, or circumferential direction.

Optionally, in one or more indentations 5 according to the present invention a soft material is introduced, which absorbs the particles that are carried into the system by the combustion. The soft material preferably comprises a material that is selected from a group consisting of copper, molybdenum, titanium, chromium, cobalt, nickel, tin, zinc, tungsten, or alloys thereof. The soft material preferably comprises a material selected from a group consisting of copper, molybdenum or lubricant varnish. In general, though, all materials are applicable for the soft material that are suitable for providing a lubricating effect, as is usually desirable in the construction of piston skirts or cylinder walls (e.g. in the form of inclusions or beads in the piston skirt/cylinder wall).

In one embodiment, the filling amount level of the soft material in the indentation (in % of the depth of the cavity, i.e. the vertical distance from the ring edge to the lowest point of the indentation) is between 2% and 99%, but preferably between 5% and 50% and most preferably between 10% and 30%.

The indentations 5 of the present invention can either be mechanically milled into the piston ring or (chemically) abraded, using known methods.

The invention claimed is:

1. A piston ring for an internal combustion engine, comprising:
    an outer circumferential face;

an inner circumferential face opposite the outer circumferential face;

a first axial face;

a second axial face opposite the first axial face; and at least two indentations provided on the first axial face for interfacing with a ring groove in a piston on which the piston ring is installed, wherein the indentations have a varying depth profile that varies along a circumferential direction of the piston ring, and wherein at least one of the indentations contains a soft material inserted therein and another of the indentations is unfilled.

2. The piston ring according to claim 1, wherein an axial distance between the first axial face and a shallowest point of the indentation is no greater than 50% of an axial distance between the first axial face and a deepest point of the indentation.

3. The piston ring according to claim 1, wherein the depth profile of the indentations varies in a sinusoidal manner along a circumferential direction of the piston ring.

4. The piston ring according to claim 1, wherein the indentations are located at radially varying distances from an edge of the axial face.

5. The piston ring according to claim 4, wherein the radial distances at which the indentations are located from the edge of the axial face vary sinusoidally in the circumferential direction.

6. The piston ring according to claim 1, wherein at least two indentations provided on the first axial face comprise a first indentation and a second indentation, wherein the second indentation has a varying depth profile in the circumferential direction of the piston ring, which is phase-shifted relative to the depth profile of the first indentation.

7. The piston ring according to claim 1, wherein the soft material comprises a material that is selected from a group consisting of copper, molybdenum, titanium, chromium, cobalt, nickel, tin, zinc, tungsten, and alloys thereof.

8. The piston ring according to claim 1, wherein the soft material comprises a material selected from a group consisting of copper, molybdenum and lubricant varnish.

9. A piston ring for an internal combustion engine, comprising:

an outer circumferential face;

an inner circumferential face opposite the outer circumferential face;

a first axial face;

a second axial face opposite the first axial face; and at least two indentations provided on the first axial face for interfacing with a ring groove in a piston on which the piston ring is installed, and wherein at least one of the indentations contains a soft material inserted therein and another of the indentations is unfilled.

10. The piston ring according to claim 9, wherein the indentations are located at radially varying distances from an edge of the axial face.

11. The piston ring according to claim 9, wherein a depth profile of at least one of the indentations varies along a circumferential direction of the piston ring.

12. The piston ring according to claim 11, wherein the depth profile of the at least one indentation that varies along a circumferential direction varies in a sinusoidal manner.

\* \* \* \* \*